No. 822,659. PATENTED JUNE 5, 1906.
W. S. EMERT.
DRAFT EQUALIZER.
APPLICATION FILED DEC. 27, 1905.
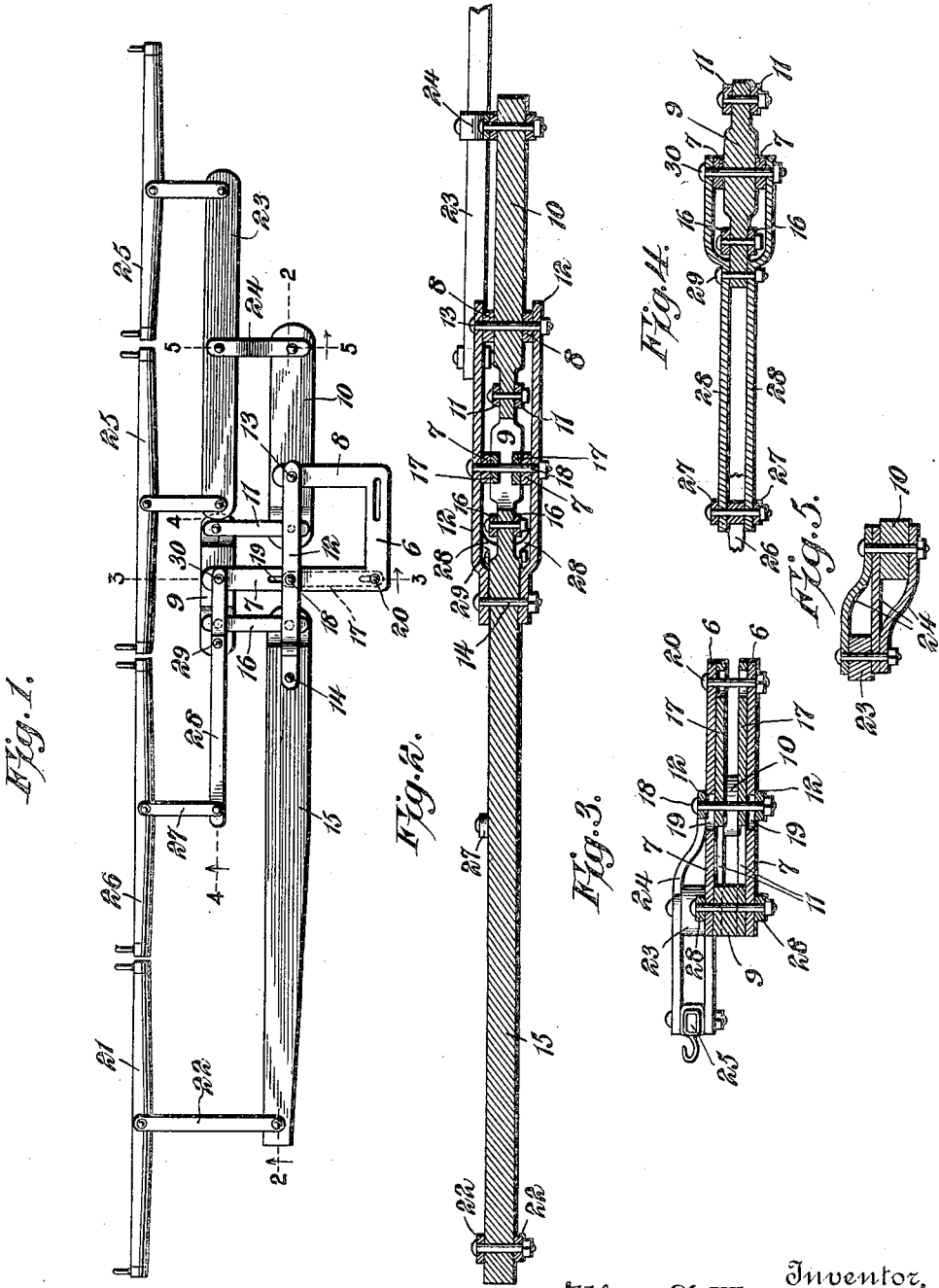
Witnesses
Howard D. Orr.
B. G. Foster
Inventor,
William S. Emert,
By C. G. Siggers
Attorney

UNITED STATES PATENT OFFICE.

WILLIAM S. EMERT, OF PEORIA, ILLINOIS.

DRAFT-EQUALIZER.

No. 822,659.  Specification of Letters Patent.  Patented June 5, 1906.

Application filed December 27, 1905. Serial No. 293,461.

*To all whom it may concern:*

Be it known that I, WILLIAM S. EMERT, a citizen of the United States, residing at Peoria, in the county of Peoria and State of Illinois, have invented a new and useful Draft-Equalizer, of which the following is a specification.

The principal object of this invention is to provide novel means of a simple and practicable nature whereby a greater number of animals may be located on one side of a line of draft of an agricultural implement than on the other without, however, creating or imparting any side draft to the implement or machine, said means, moreover, being so constructed that the number of animals may be varied without altering the direct, forward, and proper draft through the mechanism to the machine or implement attached thereto.

One embodiment of the invention is illustrated in the accompanying drawings and is described in the following specification. An inspection of the claims appended, however, will show that the invention is not limited solely to the structure set forth.

In the drawings, Figure 1 is a plan view of the equalizer. Fig. 2 is a longitudinal sectional view on the line 2 2 of Fig 1. Fig. 3 is a cross-sectional view on the line 3 3 of Fig. 1. Fig. 4 is a detail longitudinal sectional view on the line 4 4 of Fig. 1, and Fig. 5 is a detail cross-sectional view on the line 5 5 of Fig. 1.

Similar reference-numerals designate corresponding parts in all the figures of the drawings.

In the embodiment illustrated a support is employed in the form of a frame comprising a cross-bar 6, having forwardly-extending arms 7 and 8, the arm 7 being longer than the arm 8. This frame, and consequently the cross-bar and arms, are composed of spaced sections, and between the front ends of the sections of the longer arm 7 is pivoted a short evener-bar 9, that is located transversely of said arm. Fulcrumed to and between the front ends of the sections of the arm 8 is a lever 10, the inner portion of said lever being preferably shorter than the outer portion and being connected to the adjacent advance end of the evener-bar by means of links 11.

Pivoted above and below the front ends of the arm-sections 8 are fulcrum-bars 12, the same being connected to said arm 8 and also to the lever 10 by the pivot-bolt 13, which connects said lever 10 to the arm. These fulcrum-bars extend across the arm 7 and project on the opposite side of the same to the arm 8. Between and to their free ends is fulcrumed, by means of a bolt 14, a lever 15, the inner end of which is disposed in rear of the adjacent end of the evener-bar and is connected thereto by links 16. The outer arm of this lever 15 is considerably longer than the outer arm of the lever 10, as clearly shown in Figs. 1 and 2.

The fulcrum-bars 12 are slidable longitudinally of the arm 7 and are connected thereto by links 17, said links being disposed between the sections of the arm, as shown in Fig. 2, and being connected to the fulcrum-bars by means of a bolt 18 passing through slots 19 in the sections of the arm. The rear ends of the links are connected to the supporting-frame at the juncture of the cross-bar and arm 7 by means of a bolt 20 passing therethrough and through slots in the rear ends of the links, as illustrated in Fig. 3 and indicated in dotted lines in Fig. 1.

Whiffletrees or swingletrees may be connected to the mechanism above described in a variety of ways. For instance, in Fig. 1 there is illustrated a four-horse evener, wherein the draft of one horse overcomes or equalizes that of the other three. The invention, however, is not limited to this number, and the arrangement can be changed as desired. In the present embodiment, however, a swingletree 21 is connected by links 22 to the outer end of the lever 15, while a doubletree 23 has link connections 24 with the outer end of the shorter lever 10. The doubletree 23 is provided with the usual swingletrees 25. A fourth swingletree 26 has link connections 27 with a lever 28, the inner end of said lever overlying the arm of the evener-bar to which the lever 15 is attached and being connected thereto, as shown at 29, and also to the front end of the arm 7 by means of the bolt 30, which secures the evener-bar.

In use the equalizer is connected by means of the supporting-frame to any agricultural or other implement, and consequently it will be seen that the animals will be unequally distributed on opposite sides of the line of draft. Experience has demonstrated, however, that no twisting or side strains will be imparted to the implement and that the draft of the animal hitched to the swingletree 21 will equalize that of the other three animals. At the same time while the levers have comparatively free play in order to permit the necessary movements of the animals the structure is substantially rigid when a turn is being made.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention..

Having thus described my invention, what I claim as new, and desire to secure by Letters Patent, is—

1. In a draft-equalizer, the combination with a support, of levers projecting on opposite sides of the support, an evener-bar pivoted between its ends on the support in advance of the levers, connections between the levers and the end portions of the evener-bar and whiffletrees connected to the levers.

2. In a draft-equalizer, the combination with a support, of levers fulcrumed between their ends and projecting on opposite sides of the support, an evener-bar pivoted between its ends on the support in advance of the levers, link connections between the inner ends of the levers and the end portions of the evener-bar, and whiffletrees connected to the levers.

3. In a draft-equalizer, the combination with a supporting-frame including a forwardly-projecting arm, of an evener-bar pivoted between its ends to the front end of the arm, levers fulcrumed on the opposite sides of the arm and independently thereof, whiffletrees connected to the outer ends of the levers, and links connecting the inner ends of the levers and the end portions of the evener-bar.

4. In a draft-equalizer, the combination with a support, of an evener-bar mounted thereon, levers connected to the ends of the evener-bar, and a connection between the levers.

5. In a draft-equalizer, the combination with a support, of an evener-bar pivoted between its ends on the support, levers projecting on opposite sides of the support, connections between the levers and the evener-bar, and a connection between the levers extending across the support.

6. In a draft-equalizer, the combination with a supporting-frame including a forwardly-projecting bar, of an evener-bar pivoted upon said projecting bar, a fulcrum-bar extending across the forwardly-projecting bar at one side of the evener-bar, levers fulcrumed on said latter bar and located on opposite sides of the forwardly-projecting bar, and links connecting the inner ends of the levers and the ends of the evener-bar.

7. In a draft-equalizer, the combination with a support, of an evener mounted thereon, levers projecting on opposite sides of the support, connections between the levers and the evener, a connection between the levers extending across the support, and a device secured to said connection and to the support.

8. In a draft-equalizer, the combination with a support, of an evener mounted thereon, a fulcrum-bar extending across the support, levers connected to said bar and extending on opposite sides of the support, connections between the levers and the evener, and a link connecting the fulcrum-bar between its ends to the support.

9. In a draft-equalizer, the combination with a supporting-frame including a forwardly-projecting arm comprising spaced sections, of an evener-bar pivoted to and between the front ends of said sections, a fulcrum-bar comprising sections extending across the arm in rear of the evener-bar, links connecting the fulcrum-bar and supporting-frame, levers connected to said fulcrum-bar, and links connecting the inner ends of the levers and the evener-bar.

10. In a draft-equalizer, the combination with a supporting-frame having spaced forwardly-extending arms, of an evener pivoted between its ends to one of the arms, a lever pivoted between its ends on the other arm, another lever located on the opposite side of the arm carrying the evener, links connecting the inner ends of the levers and the ends of the evener, a fulcrum-bar connecting the latter lever and the arm on which the first-mentioned lever is pivoted, and links connecting the said bar and the supporting-frame.

11. In a draft-equalizer, the combination with a supporting-frame including forwardly-projecting arms, one of which is longer than the other, of an evener-bar pivoted between its ends on the front end of the longer arm, a lever pivoted between its ends on the front end of the shorter arm, a link connecting the inner end of said lever and the adjacent end of the evener-bar, a fulcrum-bar pivoted upon the shorter arm and having a link connection with the frame, said fulcrum-bar extending across the longer arm, a lever pivoted upon the free end of the fulcrum-bar, and a link connecting the inner end of said lever and the adjacent end of the evener-bar.

12. In a draft-equalizer, the combination with a supporting-frame including a forwardly-projecting arm, of an evener-bar pivoted between its ends upon the arm, levers fulcrumed in rear of the evener-bar, links connecting said levers and the evener-bar, whiffletrees connected to the levers, another lever connected to the evener-bar, and a whiffletree having a connection with the latter lever.

In testimony that I claim the foregoing as my own I have hereto affixed my signature in the presence of two witnesses.

WILLIAM S. EMERT.

Witnesses:
GEORGE BESSLER,
J. S. TAMMERU.